Patented Aug. 30, 1927.

1,640,506

UNITED STATES PATENT OFFICE.

FRIEDRICH LEUCHS, OF ELBERFELD, GERMANY, ASSIGNOR TO WINTHROP CHEMICAL COMPANY, INC., OF NEW YORK, N. Y.

ANTISPASMODIC.

No Drawing. Application filed December 16, 1925, Serial No. 75,872, and in Germany March 24, 1925.

The present invention relates to the manufacture and production of new urethanes of alkylized benzylalcohols which have proved to be valuable antispasmodics which are free from any noxious and toxic action and are free from any disagreeable taste.

The new urethanes are obtained by the known methods to produce such compounds, e. g. by treating the alcohol with phosgene and the resulting chloro-carbonate with ammonia or by treating the alcohol with carbamic chloride $NH_2$—CO—Cl.

My new products are generally crystalline products soluble in alcohol and hot water and only soluble with difficulty in ether.

In order to illustrate my invention I give the following example, the parts being by weight: 15 parts of paratoluylalcohol are dissolved in 15 parts of absolute ether and 10 parts of carbamic chloride are added whilst stirring. After 12 hours the product of the reaction is filtered off and crystallized from boiling water. The para-methyl-benzyl-urethane having most probably the formula:

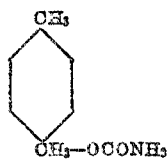

crystallizes in the form of fine colorless needles melting at 122–123° C. It is easily soluble in alcohol and in hot water and soluble with difficulty in ether and cold water. It is nearly tasteless.

The ortho-methylbenzyl-urethane melts at 86–87°.

The urethane of the phenyl-ethyl-carbinol having most probably the formula:

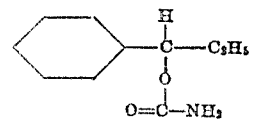

melts at 78–80° C.

I claim:

1. The herein described new urethanes of alkylized benzylalcohols being generally whitish crystalline products soluble in alcohol and hot water and being valuable antispasmodics.

2. The herein described para-methyl-benzyl-urethane having most probably the formula

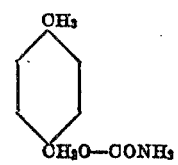

which crystallizes from water in needles melting at 122–123° C. soluble in alcohol and hot water, soluble with difficulty in ether and cold water, and being a valuable antispasmodic.

In testimony whereof I have hereunto set my hand.

FRIEDRICH LEUCHS.